United States Patent
Ephraim et al.

(10) Patent No.: US 6,571,836 B2
(45) Date of Patent: Jun. 3, 2003

(54) FILLER CUP FOR FLUID FILTER

(75) Inventors: Stephen Russell Ephraim, Cedar Falls, IA (US); Daniel Lee Sturm, Cedar Falls, IA (US); Brent Charles Naylor, Waterloo, IA (US); Kurt Joseph Kaliban, Waterloo, IA (US)

(73) Assignee: Deere & Company, Moline, IL (US)

( * ) Notice: Subject to any disclaimer, the term of this patent is extended or adjusted under 35 U.S.C. 154(b) by 41 days.

(21) Appl. No.: 09/880,267

(22) Filed: Jun. 13, 2001

(65) Prior Publication Data

US 2002/0189710 A1 Dec. 19, 2002

(51) Int. Cl.[7] ................................................. B65B 3/00
(52) U.S. Cl. ........................... 141/285; 141/59; 141/98; 141/297; 141/364
(58) Field of Search ............................ 141/59, 98, 285, 141/297–300, 364

(56) References Cited

U.S. PATENT DOCUMENTS

| | | | |
|---|---|---|---|
| 4,112,984 A | 9/1978 | Guglia et al. | 141/98 |
| 4,824,567 A | 4/1989 | Turman | 210/416.4 |
| 5,275,213 A | 1/1994 | Perkins | 141/59 |
| 5,819,822 A | * 10/1998 | Schneider et al. | 141/285 |
| 5,899,193 A | 5/1999 | Betz, II et al. | 123/516 |

OTHER PUBLICATIONS

John Deere, PowerTech 8.1 L, 6081 OEM Diesel Engines, "Operation And Service Manual". p. 45–14, Dec. 2000.
Foley Industrial Engines, Inc.; "Foley Engines Tech Tip #29"; pp. 1–2; May 29, 2001.
John Deere, PowerTech 8.1 L, 6081 OEM Diesel Engines, "Operation And Service Manual". pp. 15–26, 15–27, 35–4, 35–6, 45–11, 12 & 13.

* cited by examiner

Primary Examiner—J. Casimer Jacyna

(57) ABSTRACT

A fill cup is provided for a fluid filter having a housing and an end plate which enclose a filter element. The end plate has an inlet port for receiving unfiltered fluid and an outlet port from which flows filtered fluid. The fill cup includes a base having openings formed therein, a cylindrical rim which surrounds the base, and a hollow tube which extends axially through the base and rim. The tube forms a stub which projects away from the base and which is adapted to be coupled to the outlet port of the filter. The tube also forms a hollow standpipe which is aligned with the stub and which projects away from the base and into an interior of the cup. When the filler cup is mounted on the filter, the cup openings communicate fluid to the inlet ports of the filter, and the hollow tube prevents unfiltered fluid from directly entering into the outlet port and communicates air from the filter to atmosphere as the filter is filled with fluid. The stub has external threads for screwing into the outlet port of the filter, and the base of the cup sealingly engages a seal mounted on the filter end plate.

1 Claim, 2 Drawing Sheets

FILLER CUP FOR FLUID FILTER

BACKGROUND OF THE INVENTION

The present invention relates to a filler cup for filling a fluid filter, such as a fuel filter, with fluid, such as fuel.

As clean air standards have been adopted by government agencies in many regions of the world, diesel engine manufacturers have adopted new fuel systems to comply with tighter emissions regulations. These new fuel systems deliver higher injection pressures and more precise injection timing events to control exhaust emissions. In order to provide these features, the fuel pumping elements and injector passages have been re-designed to provide tighter clearances than before, making them more susceptible to plugging or damage from fuel contaminants. One of the means of protecting these fuel systems is to provide more efficient fuel filters, which trap contaminants in the 2 micron range, as compared to 4 to 5 micron filters on previous engines.

Such filters are normally replaced at a recommended service interval, consistent with diesel engine maintenance practices. When an equipment servicer replaces a canister-type ("spin-on") fuel filter on a diesel engine, it is customary to pre-fill the new filter with diesel fuel before installing it. This reduces the time required to prime the system when the engine is started. The servicer pours fuel into the top of the filter, which has ports that communicate to passages into the filtered or "clean" and the unfiltered or "dirty" sides of the filter element. In doing this it is difficult to prevent the unfiltered fuel from being poured into the "clean" side. As a result, contaminants may travel throughout the fuel system once the engine is started. This may cause damage to fuel system components, and subsequently, diminish engine performance.

SUMMARY

Accordingly, an object of this invention is to provide a device for filling fuel filters which prevents unfiltered fuel from entering into the clean side of the filter.

These and other objects are achieved by the present invention, wherein a disposable fill-assist cup is screwed onto a canister-type ("spin-on") fuel filter. The fuel filter has inlet ports for receiving unfiltered fuel and a threaded central outlet port from which flows filtered fuel. The cup has a circular base and a cylindrical rim. A hollow threaded stub projects away from the base and away from the interior of the cup. The stub screws into the outlet port of the filter. The cup also has a hollow central cylindrical tube or standpipe which is aligned with the stub and which projects away from the base and into the interior of the cup. A plurality of openings are formed in the base. These openings communicate fuel to the inlet ports and to the unfiltered or dirty side of the filter, after the cup is attached to the filter.

The stub attaches the cup to the filter, the stub and standpipe together prevent unfiltered fuel from flowing into the outlet port or clean side of the filter element. The stub and standpipe also provide a path for the bleeding of air from the filter as it is filled with fuel. A snap-on cap is attached to the top of the standpipe to prevent contaminants from entering the standpipe and the clean side of the filter element. The cap has air clearance with the standpipe, in order to allow for air to escape as the fuel level is raised in the clean side of the fuel filter. A scallop in the edge of the cup is integrated to provide a thumb-hold so as to allow the filter-cup assembly to be held with one hand.

DETAILED DESCRIPTION

Figure 1:
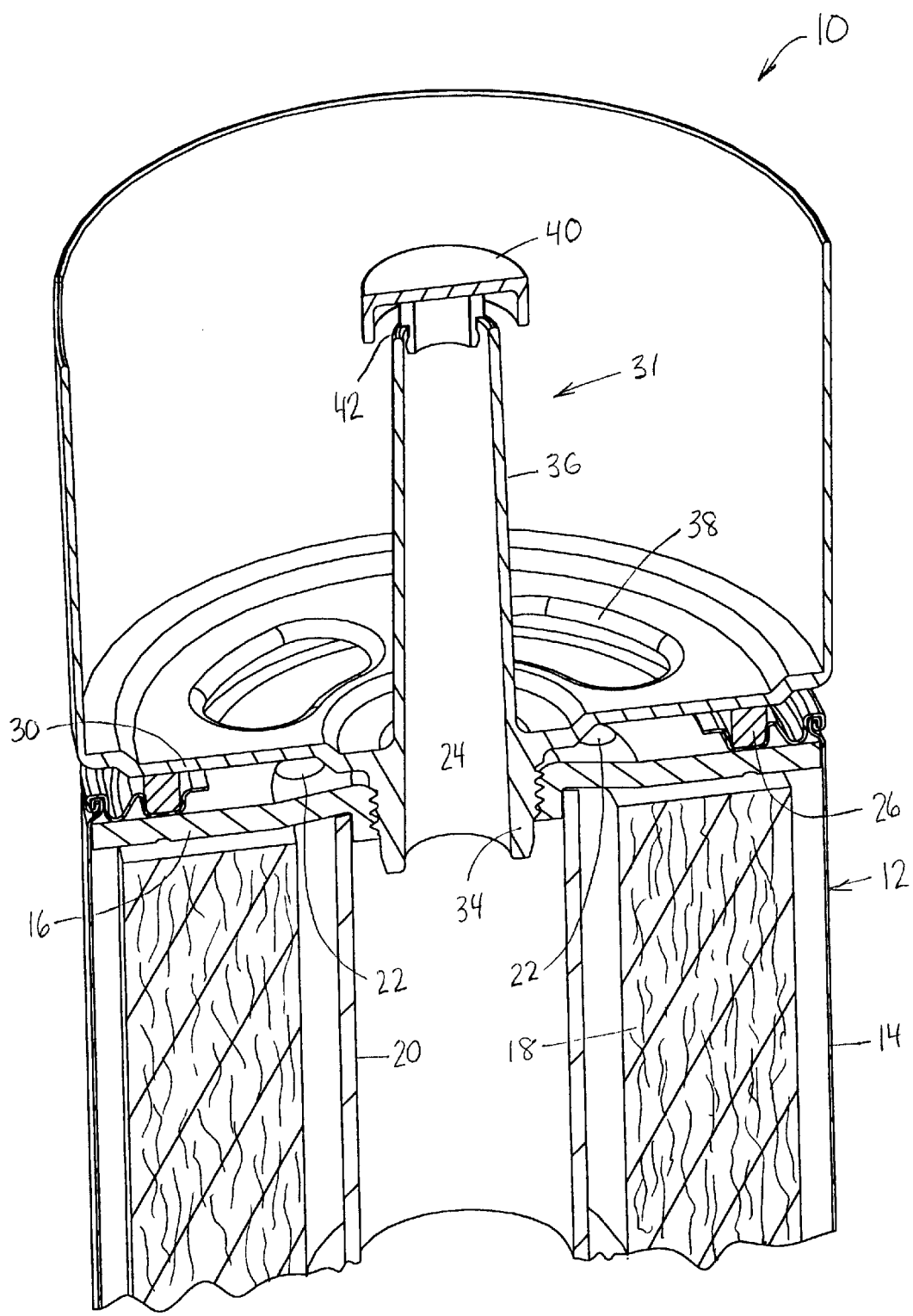
FIG. 1 is a perspective sectional view of a filler cup embodying the invention attached to an upper end of spin-on fuel filter.
Figure 2:
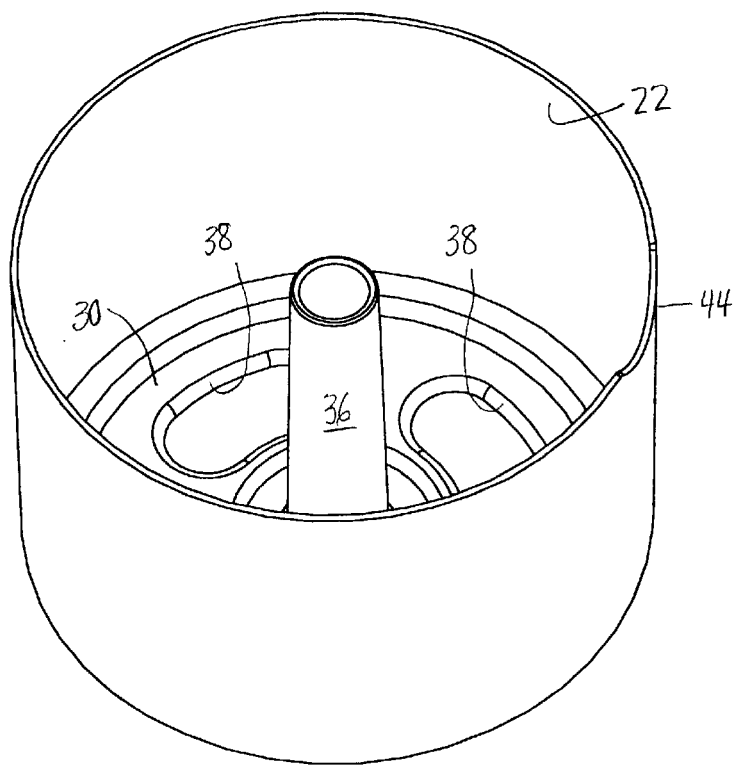
FIG. 2 is a perspective view of the filler cup of FIG. 1.
Figure 3:
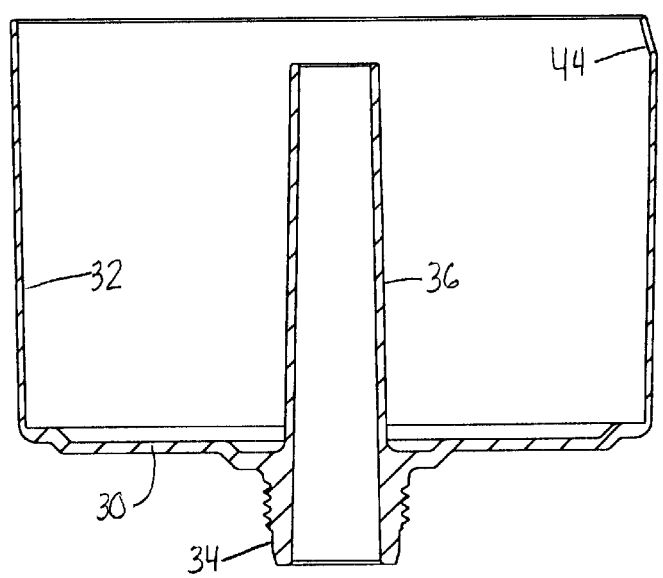
FIG. 3 is a sectional view of the filler cup of FIG. 1.

Referring to the Figures, a disposable fill-assist cup 10 is screwed onto a canister-type ("spin-on") fuel filter 12. The fuel filter 12 has a housing 14 and an end plate 16 which enclose a filter element 18 which surrounds a central hollow filter tube 20. The end plate 16 has a plurality of inlet ports 22 which receive unfiltered fuel and a central outlet port 24 from which flows filtered fuel. A conventional seal 26 is mounted on the plate 16. The outlet port 24 is internally threaded so that the filter 12 can be screwed on to a vehicle fuel system component (not shown) in a conventional manner.

The cup 10 has a rigid base 30 and an integral rigid cylindrical rim 32 which projects axially away from the base 30. A central hollow tube 31 extends axially through the base 30 and through the interior of the cup 10. One end of the tube 31 forms an externally threaded stub 34 which is exterior with respect to the cup 10 and which projects away from the base 30 and away from the interior of the cup 10. As best seen in FIG. 1, the stub 34 is adapted to be screwed into the outlet port 24 in the plate 16 of the filter 12. The tube 31 also forms a hollow central cylindrical standpipe 36 which is aligned with the stub 34 and which projects away from the base 30 and into the interior of the cup 10. A plurality of openings 38 are formed in the base 30. These openings 38 communicate fuel to the inlet ports 22 and to the unfiltered or dirty side of the filter element 18, after the cup 10 is attached to the filter 12.

The stub 34 attaches the cup 10 to the filter 12. The tube 31, which forms the stub 34 and standpipe 36, prevents unfiltered fluid which is poured into the cup 10 from flowing into the outlet port 24 or clean side of the filter 12. The tube 31 also provide a path for the bleeding of air from the filter 12 as it is filled with fluid. A snap-on cap 40 is attached to the top of the standpipe 36 to prevent contaminants from entering the standpipe 36 and the clean side of the filter element 18. The cap 40 and the end of the standpipe 36 form a gap or air clearance 42, in order to allow for air to escape as the fuel enters the filter 12. A recess or scallop 44 in the edge of the cup rim 32 provides a thumb-hold so as to allow the assembled cup 10 and filter 12 to be held with one hand.

When the cup 10 is attached to the filter 12, the base 30 sealingly engages the seal 26 which is attached to the end plate 16, and fuel can be poured into the cup 10. Fuel poured into the cup 10 flows through openings 38 and inlet ports 22 into the unfiltered side of the filter 12, through the filter element 18 and into the clean side of the filter 12, until the fuel level rises to the end plate 16. The filler cup 10 can then be removed and incinerated or discarded. The filter 12, filled with fuel, may then be installed on the engine. The cup 10 may be made from various materials and with various manufacturing processes, including an injection-molded composite. This filler cup 10 may be used in connection with diesel or non-diesel type engine fuel filters, and with hydraulic and other types of fluid filters which require priming before installation. This invention provides an affordable and practical means for pre-filling a replacement fuel filter on an emissions-controlled diesel engine, while preventing fuel contaminants from entering the fuel system.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A fill cup for a fluid filter, the fluid filter having a housing and an end plate enclosing a filter element, the end plate having an inlet port for receiving unfiltered fluid and an outlet port from which flows filtered fluid, the fill cup comprising:

a base having an opening therein;

a rim which surrounds and projects axially away from the base;

a hollow tube which extends axially through the base and rim, the tube forming a stub which projects away from the base and which is adapted to be coupled to the outlet port of the filter, and the tube forming a hollow standpipe which is aligned with the stub and which projects away from the base and into an interior of the cup, the opening communicating fluid to the inlet port of the filter, and the hollow tube communicating air from the filter to atmosphere as the filter is filled with fluid; and a snap-on cap coupled to an end of the standpipe, the cap and standpipe forming an air space therebetween.

* * * * *